United States Patent [19]

Igashira et al.

[11] 4,390,000
[45] Jun. 28, 1983

[54] AIR-FUEL MIXTURE HEATING DEVICE FOR INTERNAL COMBUSTION ENGINE

[75] Inventors: Toshihiko Igashira, Toyokawa; Ken Nomura, Okazaki; Seiko Abe, Kariya; Yasuhiko Ishida, Mishima, all of Japan

[73] Assignees: Nippon Soken, Inc., Nishio; Toyota Jidosha Kogyo Kabushiki Kaisha, Toyota, both of Japan

[21] Appl. No.: 248,285

[22] Filed: Mar. 27, 1981

[30] Foreign Application Priority Data

Mar. 28, 1980 [JP] Japan .............................. 55-42084[U]
Dec. 5, 1980 [JP] Japan .............................. 55-172233

[51] Int. Cl.³ .................................................. F02M 31/00
[52] U.S. Cl. .................................. 123/549; 261/142; 219/207
[58] Field of Search .......................... 123/549, 545, 547; 261/142; 219/205, 206, 207, 381

[56] References Cited

U.S. PATENT DOCUMENTS

| 1,426,187 | 8/1922 | Harrison | 219/205 |
|---|---|---|---|
| 1,466,406 | 8/1923 | MacDonald | 219/207 |
| 1,472,233 | 10/1923 | Taylor | 219/205 |
| 2,700,722 | 1/1955 | Gurley | 261/142 |
| 3,892,215 | 7/1975 | Hichling | 219/206 |
| 3,987,772 | 10/1976 | McBride | 123/549 |
| 4,141,327 | 2/1979 | Marcoux et al. | 123/122 F |
| 4,279,234 | 7/1981 | Marcoux | 123/549 |
| 4,308,845 | 1/1982 | Sarto | 123/549 |

FOREIGN PATENT DOCUMENTS 475676  6/1915  France ........................... 219/207

*Primary Examiner*—Ronald H. Lazarus
*Attorney, Agent, or Firm*—Cushman, Darby & Cushman

[57] ABSTRACT

A suction heating device for an internal combustion engine including a first metal member having a planar portion and a cylindrical portion extending from the flat portion for defining a passage for a fuel-air mixture, and a second metal member having a planar portion and a cylindrical portion extending from the planar portion and arranged outside the cylindrical portion of the first metal member with a predetermined spacing. The two cylindrical portions are joined to each other at the end to provide a casing for mounting therein a ceramic heater of positive temperature coefficient characteristic having a specific Curie point.

7 Claims, 8 Drawing Figures

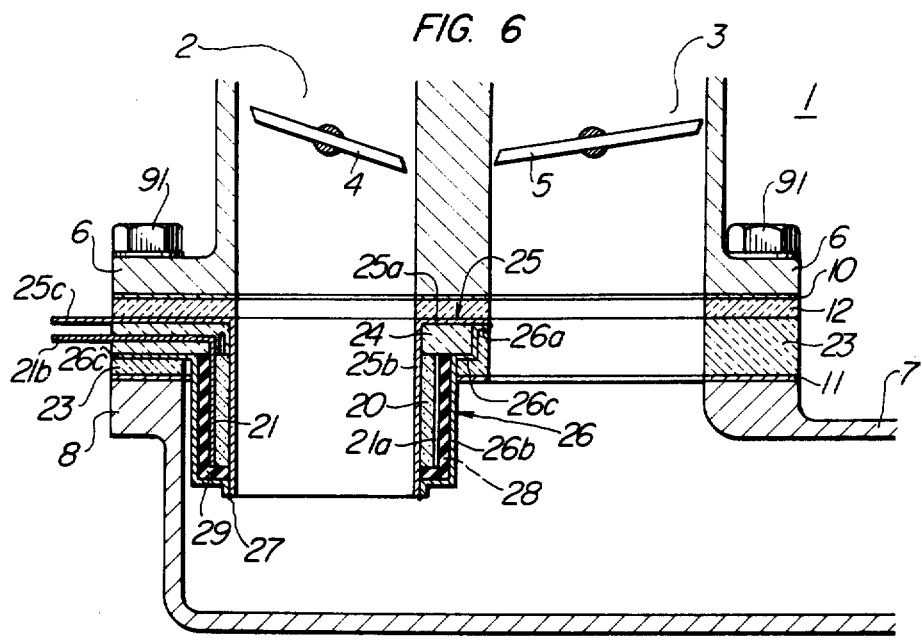

AIR-FUEL MIXTURE HEATING DEVICE FOR INTERNAL COMBUSTION ENGINE

BACKGROUND OF THE INVENTION

This invention relates to air-fuel mixture heating devices of the cylindrical shape using ceramic heaters, and more particularly it is concerned with an air-fuel mixture heating device for an internal combustion engine.

Ceramics formed of a composition comprising barium titanate as its principal constitutent by firing are known to have a low electric resistance at normal temperature and develop a very high electric resistance when a certain temperature near 120° C. referred to as a Curie point is reached. Such ceramics are generally referred to as positive temperature coefficient (PTC) thermistors and have application as heaters. An air-fuel mixture heating device of the cylindrical shape is known which uses such ceramics. When such suction heating device is mounted immediately beneath a carburetor or a fuel injector, vaporization of fuel can be advantageously achieved. In this case, it is necessary to shield the ceramic heater from the atmosphere of gasoline as by a casing, in order to avoid the risk that the fragments of the ceramic heater might be drawn into the internal combustion engine when broken and to avoid the risk that the ceramic heater might undergo deterioration due to proximity to the atmosphere of gasoline. The casing is preferably formed of metal to completely isolate the ceramic heater from the atmosphere of gasoline and avoid its invasion by gasoline. Moreover, the casing should be provided with means for supplying oxygen to its interior to enable the heater having ceramics of barium titanate to function normally.

SUMMARY OF THE INVENTION

An object of this invention is to provide an air-fuel mixture heating device for an internal combustion engine having a metal casing suitable for isolating a ceramic heater of the cylindrical or polygonal shape from the atmosphere of gasoline and capable of supplying oxygen to the ceramic heater to enable same to function normally.

Another object is to provide a suction device for an internal combustion engine of low cost having a casing formed of metal by joining parts of two members together which are shaped by means of a press.

The aforesaid objects of the invention are accomplished by providing a suction heating device located downstream of the fuel supply means for promoting vaporization of fuel-air mixtures comprising a first metal member including a planar portion and at least one cylindrical or polygonal portion of minor diameter extending from the planar portion for defining a passage for a fuel-air mixture, and a second metal member including a planar portion and at least one cylindrical or polygonal portion of major diameter extending from the planar portion and concentrically arranged outside the outer periphery of the cylindrical or polygonal portions of minor diameter, the two cylindrical or polygonal portions being joined together and sealed at the end, and a ceramic heater interposed between the two cylindrical or polygonal portions having a positive temperature coefficient characteristic and a specific Curie point.

BRIEF DESCRIPTION OF THE DRAWINGS

FIG. 6 is a vertical sectional view of the suction heating device comprising another embodiment of the invention, shown as being located immediately below the carburetor of an internal combustion engine; and FIGS. 7 and 8 show, independently of associated parts, the suction heating device shown in FIG. 6, FIG. 7 being a plan view and FIG. 8 being a front view.

DESCRIPTION OF THE PREFERRED EMBODIMENTS

Figure 1:
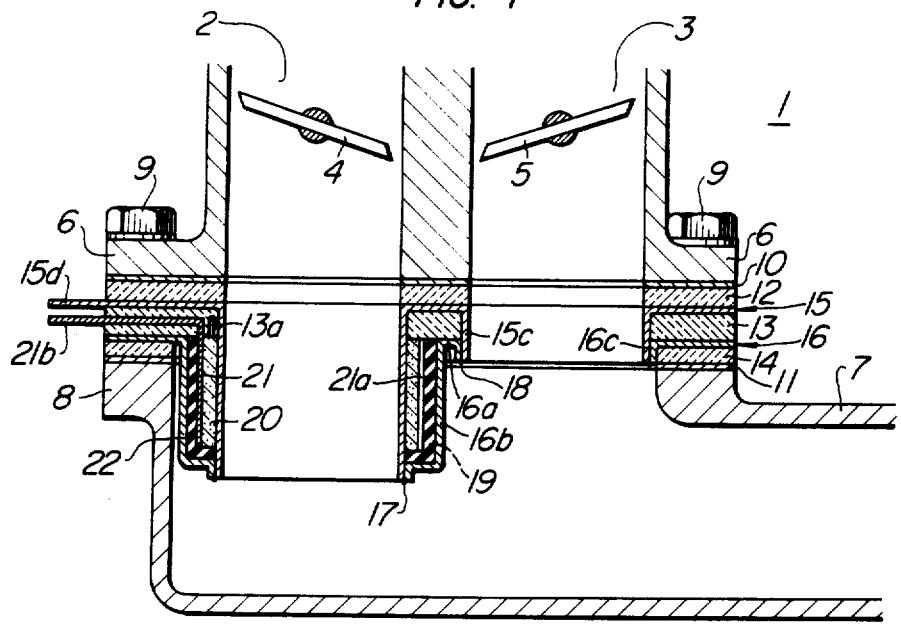
FIG. 1 is a vertical sectional view of the suction heating device comprising one embodiment of the invention, shown as being located immediately below the carburetor of an internal combustion engine.
Figure 2:
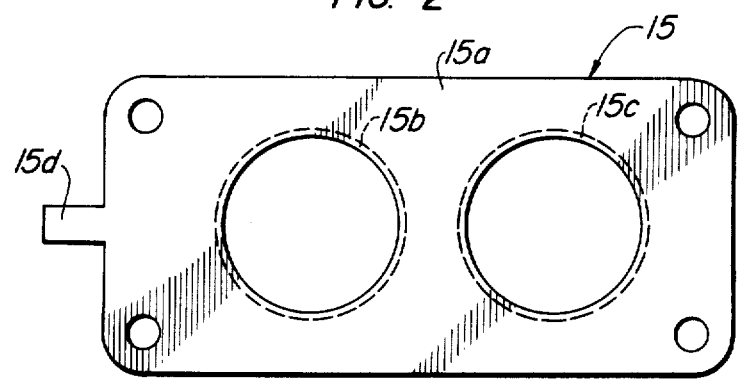
FIGS. 2–4 show, independently of associated parts, the suction heating device shown in FIG. 1, FIG. 2 being a plan view, FIG. 3 being a vertical sectional view and FIG. 4 being a front view.
Figure 3:
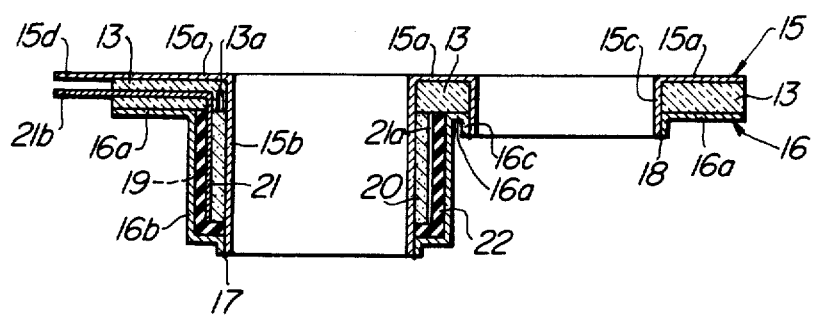
Figure 4:
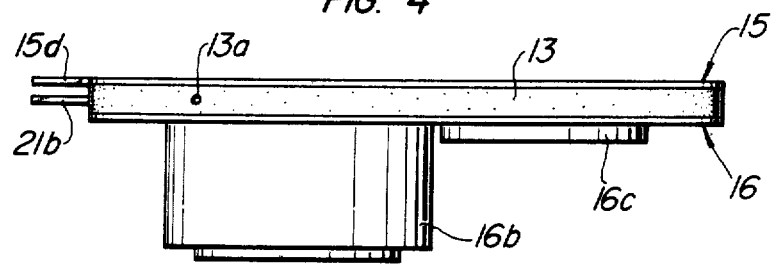
Figure 5:
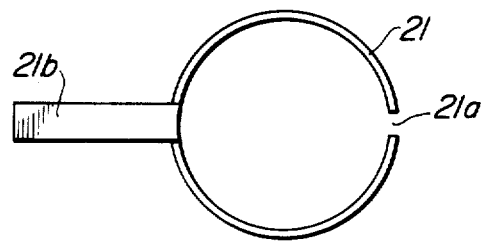
FIG. 5 is a plan view of the annular positive electrode shown in FIG. 3.

Preferred embodiments of the invention will now be described by referring to the accompanying drawings. FIGS. 1–5 show a first embodiment of the air-fuel mixture heating device in conformity with the invention which is disposed immediately beneath a carburetor 1 of the double-barrel type serving as fuel supply means for an internal combustion engine. The carburetor 1 comprises a primary barrel 2 and a secondary barrel 3 open at the upper end to the atmosphere through an air cleaner, not shown, and having throttle valves 4 and 5 located in the primary barrel 2 and secondary barrel 3 respectively for adjusting the volumes of air drawn by suction from the atmosphere. A fuel nozzle, not shown, for supplying a fuel to the carburetor 1 to form fuel-air mixtures therein is located immediately above each of the throttle valves 4 and 5. The carburetor 1 is bolted at 9 to a flange 8 of a suction pipe 7 or an intake manifold at a flange 6 formed at the lower end of the primary and secondary barrels 2 and 3. The suction pipe 7 is communicated with an engine body, not shown, of the internal combustion engine.

The air-fuel mixture heating device comprises a first metal member 15 and a second metal member 16 formed of copper held between the flange 6 of the carburetor 1 and the flange 8 of the suction pipe 7 through two gaskets 10 and 11 and three flat plates 12, 13 and 14 formed as of phenol resin which is heat insulating and electrically insulating. The first metal member 15 includes a planar portion 15a held between the two flanges 6 and 8, and two cylindrical portions 15b and 15c of minor diameter which define portions of fuel-air mixture passages. The second metal member 16 includes a planar portion 16a held between the two flanges 6 and 8, and two cylindrical portions 16b and 16c of major diameter arranged outside the outer periphery of the minor diameter cylindrical portions 15b and 15c concentrically therewith. The cylindrical portions 15b and 16b aligned with the primary barrel 2 have a greater length than the cylindrical portions 15c and 16c aligned with the secondary barrel 3. The two metal members 15 and 16 are shaped by means of a press, and the two cylindrical portions 15b and 16b aligned with the primary barrel 2 are joined to each other by welding through a weld 17 while the two cylindrical portions 15c and 16c aligned with the secondary barrel 3 are joined to each other by welding through a weld 18. The welds 17 and 18 are annular welds. Double-wall cylindrical portions are formed below the primary and secondary barrels 2 and 3 in this way, the difference between the two double-wall cylindrical portions being that a large annular space 19 is defined between the two cylindrical portions 15b and 16b below the primary barrel 2 but no space is defined between the two cylindrical portions 15c and 16c below the secondary barrel 3.

Arranged in the space 19 is a ceramic heater 20 formed of a composition comprising barium titanate as its principal constituent by firing. The ceramic heater 20 is a cylindrical heater composed of two semi-circular members which are connected together to form a cylindrical whole. The ceramic heater 20 is maintained at its inner peripheral surface in intimate contact with the cylindrical portion 15b of the first metal member 15 and has an annular positive electrode 21 disposed in intimate contact therewith at its outer peripheral surface. The annular positive electrode 21 is formed of a spring material, such as phosphor bronze, and has a slit 21a formed therein, with a strip-shaped positive electrode terminal 21b being connected to the upper end of the annular positive electrode 21. The positive electrode 21 has an inner diameter which is smaller than the outer diameter of the cylindrical ceramic heater 20, so that the positive electrode 21 can be mounted on the ceramic heater 20 by stretching the slit 21a. The resilience of the material of the positive electrode 21 forces the ceramic heater 20 composed of two semi-circular portions against the outer peripheral surface of the cylindrical portion 15b of the first metal member 15. Silicon resin, magnesia or epoxy resin is fitted in a gap between the inner peripheral surface of the cylindrical portion 16b of the second metal member 16 and the outer peripheral surface of the positive electrode 21 to provide an electrically insulating layer 22.

A portion of the positive electrode terminal 21b of the annular positive electrode 21 is joined by molding to the flat plate 13 and the rest of the positive electrode terminal 21b projects outwardly of the flat plate 13. The first metal member 15 has connected thereto a strip-shaped negative electrode terminal 15d which projects at its forward end out of the first metal member 15. The flat plate 13 is formed with an aperture or port 13a for maintaining the space 19 in which the ceramic heater 20 is mounted in communication with the atmosphere. The two metal members 15 and 16 are intimately bonded to the three flat plates 12, 13 and 14 with a bonding agent. The electrode terminals 15d and 21b are each connected to a battery, not shown, through an engine key switch, not shown.

In operation, a current is passed from the battery through the positive electrode terminal 21b, annular positive electrode 21, ceramic heater 20 and first metal member 15 to the negative electrode terminal 15d, as the key switch is turned on. At this time, the ceramic heater 20 containing barium titanate as its principal constituent generates heat, and its temperature quickly reaches its Curie point which is 120° C. However, as the temperature exceeds 120° C., electric resistance increases so that the temperature is self-controlled to the neighbourhood of 120° C. The heat generated by the ceramic heater 20 is transferred to the cylindrical portion 15b of the first metal member 15 to keep its temperature at about 100° C. The fuel supplied to the primary barrel 2 of the carburetor 1 which is not changed into atomized particles flows downwardly along the wall of the barrel 2 in film form and reaches the cylindrical portion 15b of the first metal member 15 which it is vaporized and thoroughly mixed with the air. The atmosphere of gasoline that has been vaporized permeates the gaskets 10 and 11 and flat plates 12 and 13 in small amounts with time and depending on temperature but is prevented from reaching the ceramic heater 20 by the two metal members 15 and 16. Meanwhile the gasoline released to outside might return and pass through the flat plate 13. However, there is no risk of such gasoline causing deterioration of the ceramic heater 20 because it is diluted.

FIGS. 6-8 show a second embodiment in which the suction heating device according to the invention is mounted below the primary barrel 2 of the carburetor 1 only. Other parts are similar in construction to those shown in FIGS. 1-5. The carburetor 1 is maintained at its upper end in communication with the atmosphere through an air cleaner, and the primary barrel 2 and secondary barrel 3 are formed with the throttle valves 4 and 5 respectively. A fuel nozzle, not shown, are mounted immediately above each of the throttle valves 4 and 5. The flange 6 at the lower end of the carburetor 1 is bolted at 9 to the flange 8 of the suction pipe 7 connected to the engine. Mounted between the flange 6 of the carburetor 1 and the flange 8 of the suction pipe 7 are the gaskets 10 and 11, the flat plate 12 and an off-set plate 23 which hold therebetween a first metal member 25 and a second metal member 26 formed of copper disposed on the side of the primary barrel 2 only. The flat and offset plates 12 and 13 are formed of a heat insulating and electrically insulating material, such as phenol resin. The first metal member 25 includes a planar portion 25a interposed between the two flanges 6 and 8, and a cylindrical portion 25b of minor diameter, and the second metal member 26 includes planar portions 26a and 26c interposed between the two flanges 6 and 8, and a cylindrical portion 26b of major diameter arranged concentrically with the cylindrical portion 25b of minor diameter, so that a double-wall portion including the cylindrical portions 25b and 26b is disposed below the primary barrel 2 only. The two cylindrical portions 25b and 26b are joined by welding at the lower end to form an annular weld 27. The double-wall portion below the primary barrel defines a large cylindrical space 28 between the two cylindrical portions 25b and 26b of minor and major diameters respectively for mounting therein the ceramic heater 20 formed by firing of a composition comprising barium titanate as its principal constituent. The ceramic heater 20 is of the same construction as the ceramic heater 20 described with reference to the first embodiment and maintained in intimate contact with the cylindrical portion 25b of the first metal member 25 at its inner peripheral surface and in intiamte contact with the annular positive electrode 21 at its outer peripheral surface. The annular positive electrode 21 is of the same construction as the annular positive electrode 21 described with reference to the first embodiment, and mounted on the ceramic heater 20 by stretching the slit 21a to force the ceramic heater 20 against the cylindrical portion 26b of the second metal member 26. The inner peripheral surface of the cylindrical portion 26b of the second metal member 26 and the outer peripheral surface of the annular positive electrode 21 define a space filled with an electrically insulating layer 29 formed of silicone resin, magnesia or epoxy resin. The positive electrode terminal 21b of the annular positive electrode 21 is molded at a part to a flat plate 24 and the rest of the terminal 21b projects outwardly of the flat plate 24. A negative electrode terminal 25c of the strip shape formed in the first metal member 25 projects outwardly of the first metal member 25 at its forward end. The flat plate 24 is formed with a port 24a for maintaining the space 28 mounting the ceramic heater 20 in communication with the atmosphere. The two metal members 25 and 26, flat plate 12, offset plate 21 and flat plate 24 are bonded to one another with a bonding agent. The electrode terminals 25c and 21b are connected to a battery, not shown, through an engine key switch, not shown.

In operation, a current flows from the battery through the positive electrode terminal 21b annular positive electrode 21, ceramic heater 20, first metal member 25 to the negative electrode terminal 25c. The ceramic heater 20 generates heat and self-controls the temperature at about 120° C. which is the Curie point, so that the cylindrical portion 25b of the first metal member 25 is kept at about 100° C. to let the fuel flowing down the inner wall surface of the primary barrel 2 in film form without being changed into atomized particles be vaporized and thoroughly mixed with air to form a fuel-air mixture in the same manner as described by referring to the first embodiment. In the second embodiment, the carburetor 1 has been shown and described as being used as fuel supply means, but the invention is not limited to this specific form of fuel supply means and a fuel injection valve may be mounted upstream of each of the throttle valves 4 and 5 for supplying a fuel. In the embodiments, the carburetor has been shown and described as being of the double-barrel type. However, the invention is not limited to this specific form of the carburetor and any type of carburetor, either a carburetor of the single-barrel, tripple-barrel or quadruple-barrel type, may be used. When the ceramic heater 20 used is only one in number, it is advantageously be mounted below the primary barrel of the carburetor where the lowest load is applied thereto.

In the embodiment, the first and second metal members 25 and 26 include cylindrical portions 25b and 26b. However, the cylindrical portions 25b and 26b may be replaced by polygonal portions.

In the embodiments, the flat plates 13 and 24 are formed with the ports 13a and 24a respectively. However, when the flat plates 13 and 24 are formed of air-permeable material, the ports 13a and 24a may be dispensed with. For example, such materials include porous ceramics.

From the foregoing description, it will be appreciated that according to the invention, the cylindrical or polygonal portions of the two metal members are arranged concentrically and joined at the lower end to each other by welding, brazing or soldering, to provide a casing suitable for supporting a ceramic heater of the suction heating device. The casing which is suitable for the purpose of supporting the ceramic heater is of low cost because the two metal members may be readily produced from two metal sheets by means of a press and joined together by welding. The arrangement that the planar portions of the two metal members can be held between the fuel supply means and the suction pipe enables the suction heating device to be readily secured in place and permits the ceramic heater to be completely separated from the atmosphere of fuel while allowing the ceramic heater to be readily maintained in communication with the atmosphere. The provision of the planar portions to the metal members makes it possible to use flat plates of heat insulating and electrically insulating material for the metal members which can be readily produced and assembled.

What is claimed is:

1. An air-fuel mixture heating device for an internal combustion engine, adapted to be disposed between fuel supply means and a suction pipe for the engine, for promoting vaporization of a fuel, comprising:
a first metal member including a planar portion, and a pipe portion of minor diameter extending from said planar portion to define a passage for a fuel-air mixture;
a second metal member including a planar portion, and a pipe portion of major diameter extending from said planar portion and arranged outside said pipe portion of minor diameter of said first metal member concentrically therewith, said pipe portions of said first metal member and said second metal member being joined to each other at the end to define a cylindrical space therebetween and said planar portions being adapted to be held between the fuel supply means and the suction pipe;
three flat plates of insulating material holding said members, one between said planar portions and two for clamping the same;
a ceramic heater of positive temperature coefficient characteristic having a specific Curie point mounted in said cylindrical space; and
an insulator between said heater and one of said pipe portions.

2. An air-fuel mixture heating device for an internal combustion engine, adapted to be disposed between fuel supply means and a suction pipe for the engine, for promoting vaporization of a fuel, comprising:
a first metal member including a planar portion, and a pipe portion of minor diameter extending from said planar portion to define a passage for a fuel-air mixture;
a second metal member including a planar portion, and a pipe portion of major diameter extending from said planar portion and arranged outside said pipe portion of minor diameter of said first metal member concentrically therewith, said pipe portions of said first metal member and said second metal member being joined to each other at the end to define a cylindrical space therebetween and said planar portions being adatped to be held between the fuel supply means and the suction pipe;
a ceramic heater of positive temperature coefficient characteristic having a specific Curie point mounted in said cylindrical space; and
an annular positive electrode having a slit in one side thereof surrounding said heater and provided with a strip-shaped terminal.

3. An air-fuel mixture heating device for an internal combustion engine, adapted to be disposed between a fuel supply means and a suction pipe of the engine, for promoting vaporization of fuel comprising:
a first metal member having a first planar portion and a first pipe portion of minor diameter extending from said first planar portion to define a passage for an air-fuel mixture;
a second metal member having a second planar portion and a second pipe portion of major diameter extending from said second planar portion and arranged outside of said first pipe portion and concentrically therewith, said first and second pipe portions being joined to each other at their ends to define an almost cylindrical space therebetween;

an almost cylindrical ceramic heater of positive temperature coefficient characteristic having a specific Curie point mounted in said space, the inner surface of said ceramic heater being in contact with said first pipe portion;

a first insulating member interposed between said first and second planar portions; and an electrode member of an almost cylindrical shape disposed in said space so that the outer surface of said ceramic heater is in contact with said electrode member, said electrode member having a terminal portion extending through said first insulating member.

4. An air-fuel mixture heating device as claimed in claim 3, further comprising:

an annular insulating layer disposed in said space and between said electrode member and said second pipe portion for insulating said electrode member from said second metal member.

5. An air-fuel mixture heating device as claimed in claim 3, further comprising;

a port formed in said first insulating member for communicating said space with the atmosphere.

6. An air-fuel mixture heating device as claimed in claim 3, further comprising;

a second insulating member disposed between said first metal member and the fuel supply means; and a third insulating member disposed between said second metal member and the suction pipe of the engine.

7. An air-fuel mixture heating device as claimed in claim 3, wherein a slit is formed in a cylindrical portion of said electrode member.

* * * * *